United States Patent
Yoshida

(10) Patent No.: US 12,045,190 B2
(45) Date of Patent: Jul. 23, 2024

(54) PACKET CONTROL APPARATUS AND PACKET CONTROL METHOD

(71) Applicant: FUJITSU LIMITED, Kawasaki (JP)

(72) Inventor: Yuki Yoshida, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/932,846

(22) Filed: Sep. 16, 2022

(65) Prior Publication Data
US 2023/0185756 A1 Jun. 15, 2023

(30) Foreign Application Priority Data

Dec. 9, 2021 (JP) .................. 2021-200078

(51) Int. Cl.
*G06F 3/00* (2006.01)
*G06F 13/42* (2006.01)

(52) U.S. Cl.
CPC .. *G06F 13/4221* (2013.01); *G06F 2213/0024* (2013.01)

(58) Field of Classification Search
CPC .................. G06F 13/4221; G06F 2213/0024
See application file for complete search history.

(56) References Cited

U.S. PATENT DOCUMENTS

| | | | |
|---|---|---|---|
| 9,164,907 B2* | 10/2015 | Ajima | G06F 12/0815 |
| 11,467,998 B1* | 10/2022 | Izenberg | G06F 15/173 |
| 2007/0280278 A1* | 12/2007 | Ezawa | H04L 49/254 |
| | | | 370/351 |
| 2009/0010157 A1* | 1/2009 | Holmes | H04L 47/10 |
| | | | 370/230.1 |
| 2009/0024782 A1* | 1/2009 | Elboim | G06F 13/4059 |
| | | | 710/313 |
| 2011/0087863 A1* | 4/2011 | Watanabe | G06F 9/3875 |
| | | | 712/220 |
| 2019/0372746 A1* | 12/2019 | Tamura | H04L 7/0004 |
| 2021/0216388 A1* | 7/2021 | Kumar | G06F 11/079 |

FOREIGN PATENT DOCUMENTS

JP 2003-078557 A 3/2003
JP 2007-323098 A 12/2007

* cited by examiner

*Primary Examiner* — Henry Tsai
*Assistant Examiner* — Kim T Huynh
(74) *Attorney, Agent, or Firm* — ArentFox Schiff LLP

(57) ABSTRACT

A packet control apparatus includes a transmission source device configured to add processing wait information that indicates whether to permit immediate processing to a packet to be transmitted to a destination, and a transmission target device configured to, in a case where the processing wait information is added to the packet, wait for and receive a processing permission notification that indicates a completion of a preceding packet from the transmission source device, and process the packet, the transmission target device being a device of the destination, wherein the transmission source device and the transmission target device are coupled to each other through a bus.

12 Claims, 10 Drawing Sheets

PACKET CONTROL APPARATUS AND PACKET CONTROL METHOD

CROSS-REFERENCE TO RELATED APPLICATION

This application is based upon and claims the benefit of priority of the prior Japanese Patent Application No. 2021-200078, filed on Dec. 9, 2021, the entire contents of which are incorporated herein by reference.

FIELD

The embodiment discussed herein is related to a packet control apparatus and a packet control method.

BACKGROUND

According to the Peripheral Component Interconnect (PCI) and the PCI Express (hereinafter, these two are collectively referred to as the PCI), three types of packets including posted, non-posted, and completion exist, and method of controlling the sequence of these packets is defined. One of the definitions inhibits a packet issued later from overtaking a posted packet issued earlier in an intermediate path. This definition may degrade throughput performance depending on the configurations of the modules that perform packet communication.

In the PCI, basically, access from a host central processing unit (CPU) to an external PCI device or access from an external PCI device to a host memory is performed. Posted packets transmitted from the PCI device to the host memory are mainly host memory writes and include some write data. Similarly, non-posted packets are small packets that are mainly host memory reads and do not include data. Although a subsequent packet may not overtake the previously issued posted packets, subsequent packets may be transmitted one after another to the memory after the completion of the preceding posted packets since the completion of the preceding posted packet is immediately known when sequence control is performed near a memory controller that controls the host memory. Therefore, a jam with the packets does not occur. Although the destination of the completion packet issued from the PCI device is a host CPU, it is sufficient that the completion packets are transmitted one after another to the host CPU after the completion of the preceding posted packets. Thus, the jam does not occur.

Japanese Laid-open Patent Publication Nos. 2007-323098 and 2003-078557 are disclosed as related art.

SUMMARY

According to an aspect of the embodiments, a packet control apparatus includes a transmission source device configured to add processing wait information that indicates whether to permit immediate processing to a packet to be transmitted to a destination, and a transmission target device configured to, in a case where the processing wait information is added to the packet, wait for and receive a processing permission notification that indicates a completion of a preceding packet from the transmission source device, and process the packet, the transmission target device being a device of the destination, wherein the transmission source device and the transmission target device are coupled to each other through a bus.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Nowadays, a system-on-a-chip (SoC) form is used in which a central processing unit (CPU) and a memory controller are mounted on the same chip, and the number of memory modules to be mounted has been increased. Accordingly, in many cases, a plurality of memory controllers are arranged at separate positions such as both ends of a chip for convenience of chip mounting, board mounting, or the like. In this case, when sequence control is performed near one of the memory controllers, in a case where a posted packet for which one of the memory controllers far from the one memory controller is the destination (for example, a memory write) is transmitted, time is consumed until a response indicating the completion of the transmission is returned. Thus, for ensuring the sequence, the subsequent packets may not be transmitted during that period of time, causing staying and a jam.

In a system in which, for example, a plurality of SoC chips are included in a single compute node, since memory controllers normally exist on the plurality of SoC chips, the distance between sequence control point and the destination memory controller further increases. Accordingly, when sequence control is attempted, processing of packet fails one packet after another. This degrades the throughput performance.

Meanwhile, communication using a peer-to-peer technique in which direct communication is performed between Peripheral Component Interconnect (PCI) devices by transferring packets between root ports of the PCI is increasingly used. Nowadays, in a case where the root port of the PCI is mounted on the SoC similarly to the memory controller and a plurality of SoCs are included in a single compute node, the distance to the root port serving as the destination of the peer-to-peer packet may increase. Ensuring of sequence defined in the PCI is also desired between packets of peer-to-peer and between packets of peer-to-peer and the host memory access. In this case, similarly, when a posted packet is transmitted to the destination such as a host memory or a transfer destination root port far from the sequence control point, time is consumed to confirm the completion. Thus, a jam with the subsequent packets occurs, and the throughput performance degrades.

[A] Related Example

Figure 1:
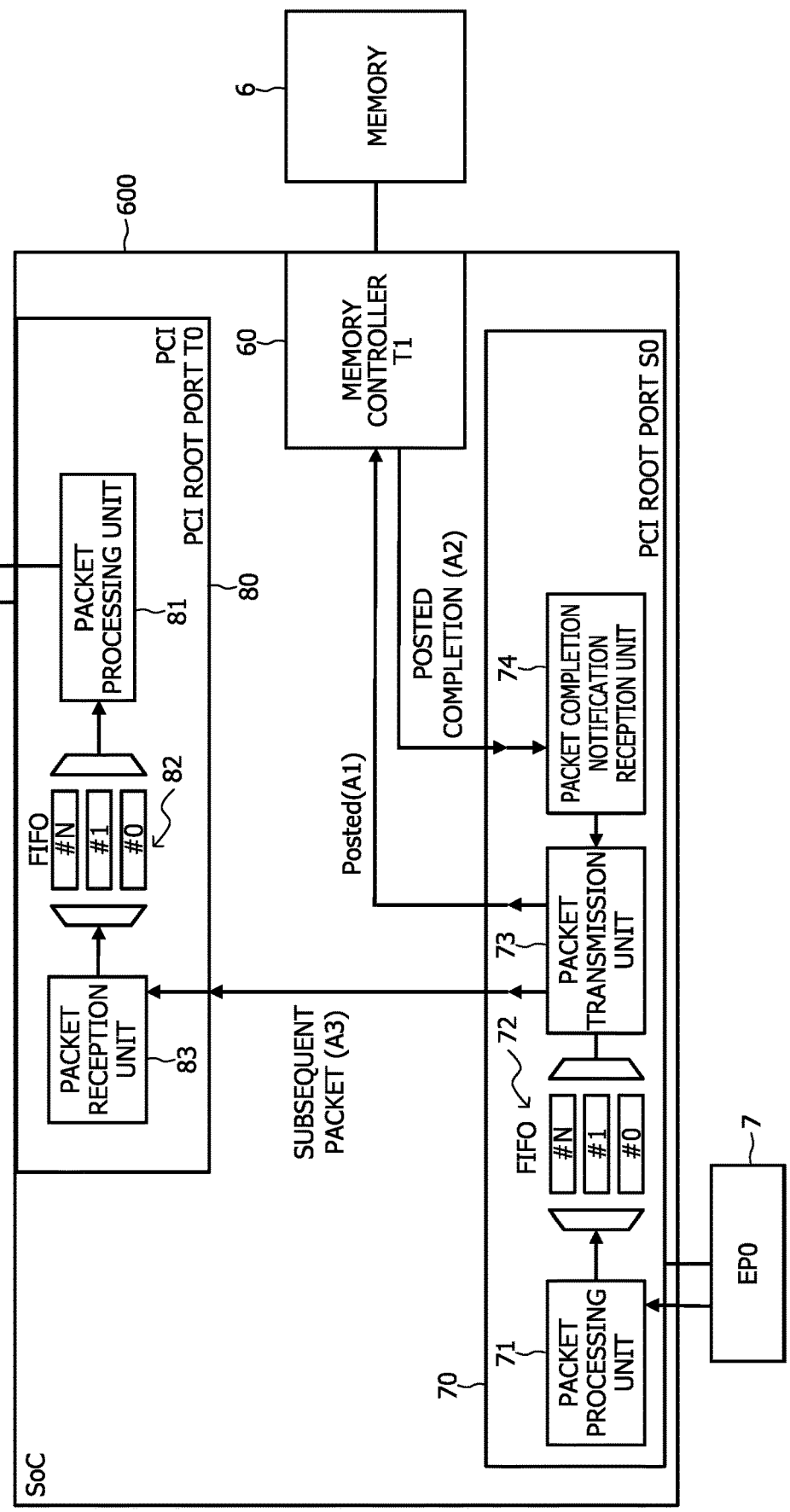
FIG. 1 is a block diagram schematically illustrating an example of a hardware configuration of a packet control apparatus according to a related example.

FIG. 1 is a block diagram schematically illustrating an example of a hardware configuration of a packet control apparatus 600 according to a related example.

Referring to FIG. 1, a PCI root port 70 (PCI root port S0), a PCI root port 80 (PCI root port T0), and a memory controller 60 (memory controller T1) exist. S0 and T0 are respectively disposed at two physically separate positions in the packet control apparatus (SoC) 600.

PCI end point devices EP7 (EP0) and EP8 (EP1) are coupled to the respective root ports, and a memory 6 serving as the host memory is coupled to the memory controller 60.

As an example, it is assumed that, after issuing a memory write (posted) to the host memory, EP0 issues a packet destined for EP1 to S0 as the subsequent packet. S0 stores, in a first-in, first-out (FIFO) 72, two packets received in a packet processing unit 71. Then, S0 sequentially extracts the packets from the FIFO 72 and processes the extracted packets.

First, S0 extracts a write (posted) packet to be written to the memory 6 at a packet transmission unit 73 and transmits the packet to T1 to write the packet to the memory 6 (see reference sign A1).

Next, although S0 is to extract and process the subsequent packet, S0 waits for the completion of a preceding host memory write because the preceding posted packets may not be overtaken due to the PCI definition.

After receiving the completion of the write to the memory 6 (posted completion) at a packet completion notification reception unit 74 (see reference sign A2), S0 transmits the subsequent packet extracted from the FIFO 72 to T0 as a P2P packet destined for the next EP1 (see reference sign A3).

T0 receives the packet at a packet reception unit 83 and stores the packet in an internal FIFO 82. After that, T0 extracts the packet from the FIFO 82 and transmits the packet to the EP1 at a packet processing unit 81.

In a case where subsequent packets are transmitted one after another from EP0, the packets are accumulated in the FIFO 72 in S0 while waiting for the completion of the preceding posted packets, the FIFO 72 is filled at some point, and there is no choice for EP0 but to temporarily stop the transmission.

For example, this indicates that throughput performance is not necessarily sufficiently obtained. Thus, with the configuration of the related example, in a case where packets are transmitted to a plurality of destinations such as T0 and T1 illustrated in FIG. 1, the throughput performance is not necessarily obtained.

Accordingly, as a method of maintaining the throughput, it is thought that the throughput performance from the sequence control point to a destination such as a memory controller 60 or an other root port is improved so as to be higher than theoretical throughput performance on the PCI side (IO device to sequence control point).

This may be realized by, for example, increasing the operation clock frequency of the memory controller 60, an other root port, or the like, or increasing the amount of data that may be transmitted per clock cycle. Even when the subsequent packets are not necessarily transmitted temporarily and a jam with the subsequent packets occurs, the jam may be resolved sooner or later when the subsequent packets may be transmitted to the destination at a speed higher than the speed at which the subsequent packets further arrive from the PCI side.

Accordingly, when a buffer that may hold the amount corresponding to the temporary jam is prepared at the sequence control point, performance close to the theoretical throughput performance on the PCI side may be obtained on average.

As an other method, instead of writing host memory writes to a plurality of memories 6 which are positionally distributed, a single cache coherent with the memory 6 and an other cache is placed near the sequence control point. The completion of the host memory write may be quickly known at the control point by writing to the cache. Host memory writes may be transmitted to the cache without causing them to wait for the completion of the preceding host memory write and the cache may sequentially process the host memory writes.

Since the subsequent posted packets may overtake the preceding non-posted packets or completion packets, the posted packets may be transmitted to the cache without causing a jam as long as the posted packet is a host memory write. Depending on the number or the distance of the home agents in which cache coherent control or cache coherent management of the chip is performed, a certain amount of time is taken to know the completion of the preceding host memory write. This causes a jam with the subsequent non-posted packets or completion packets.

However, since the host memory read, which is a main element of the non-posted packets, is a small packet without data. The completion is a response to a read having a small size such as 4B or 8B normally issued from the host CPU, and accordingly, the size of the completion is not large even though the completion is with data. Thus, it is unlikely to suppress the buffer that temporarily stores the packets that cause a jam.

For example, there is a problem in that the throughput is not necessarily obtained with the configuration of related art as illustrated in FIG. 1. Furthermore, because of reasons as described below, there is limitation of the above-described improvement obtained by the sequence control method of related art.

Although a certain effect may be produced by a method of improving the throughput performance on the destination side from the sequence control point so as to be higher than the theoretical throughput performance on the PCI side, the throughput performance on the PCI side is increasing year by year, and it is difficult to make a difference in performance. In addition, there is a problem in that access latency tends to increase due to an increase in distance to an access target in a multi-SoC 600 configuration or the like, and accordingly, the number of subsequent packets that is not necessarily transmitted increases and the buffer capacity for holding those packets also significantly increases.

In a case where the host memory write is written to a near cache, a certain effect may be obtained when access from the PCI device is only to the host memory. However, clearly, it becomes unlikely to obtain the effect in a case where access to an other PCI device, for example, a peer-to-peer is included.

In peer-to-peer, memory write access to an other PCI device may not be written to a cache in a chip. Accordingly, when there is a preceding host memory write, the subsequent memory write to the PCI device may be transmitted only after the completion of the preceding host memory write, and conversely, the subsequent host memory write may be transmitted only after the completion of the preceding memory write to the PCI device. In the case of the completion, a completion may be for a large-size read received from an other PCI device, and in this case, since large-size data is attached to the completion packet, a buffer for packets that cause a jam may be suppressed.

Accordingly, there is basically a limitation of improvement in throughput with the configuration or a way of the related example.

[B] Embodiment

Hereinafter, with reference to the drawings, an embodiment of a technique for realizing both inter-packet sequence control and throughput performance in packet communication will be described. The embodiment described below is merely exemplary and is not intended to exclude application of various modification examples or techniques that are not explicitly described in the embodiment. For example, the present embodiment may be carried out by modifying the embodiment in various manners without departing from the gist of the embodiment. Each of the drawings is not intended to indicate that only the elements illustrated in the drawing are included. Thus, other functions or the like may be included.

In the following description, the same reference numerals denote the same or similar elements in the drawings, so that the description thereof is omitted.

According to the embodiment, a phase in which an actual packet is transmitted to the destination and a phase in which a notification that permits the transmitted packet to be processed in a transmission target that is the destination is transmitted to the destination are separated, thereby resolving a jam with packets at the sequence control point and improving internal bus use efficiency, so that the throughput performance is improved.

In a case where a root port (S0) in an SoC 100 (described later with reference to FIG. 2) receives a packet from a PCI bus thereunder and transmits the packet to a destination (a host memory or an other root port) (T0) that is a target of the access, even when there is a posted packet that S0 has transmitted in advance to an other destination T1 (mainly a write to the host memory or a memory write to a PCI device under the destination root port), the packets subsequently received are transmitted to the respective destination before the completion of the posted packets.

A destination unit (T0) that receives the transmitted packets as described above buffers the packets therein in the sequence of reception of the packets and puts the processing on hold.

At a time point when the transmission source S0 recognizes the completion of the preceding posted packets destined for T1, the transmission source S0 transmits a notification of the completion of the preceding posted packets (for example, a processing permission notification) to the destination T0.

Upon reception of the processing permission notification, the destination T0 processes the buffered packets sequentially. Here, the processing indicates write/read process in a case where the destination T0 is a host memory or a cache thereof. In a case where the destination T0 is an other root port, the processing indicates issuance of the packets to the PCI bus, and the issuance to the PCI bus is performed in a state in which the sequence control definition of the PCI is continuously ensured. In a case where the destination is a CPU core (completion only), the timing of the processing is at timing at which the CPU core recognizes the processing permission notification.

In this way, since S0 as the transmission source that is the sequence control point is not basically desired to buffer the packets subsequent to the posted packets, the throughput performance may be obtained even though a large buffer is not prepared. Since the packets having arrived from the PCI bus under S0 may be transmitted to the destinations one after another, the throughput performance from S0 to the destination T0 is not desired to be higher than the throughput performance of the PCI bus.

Figure 2:
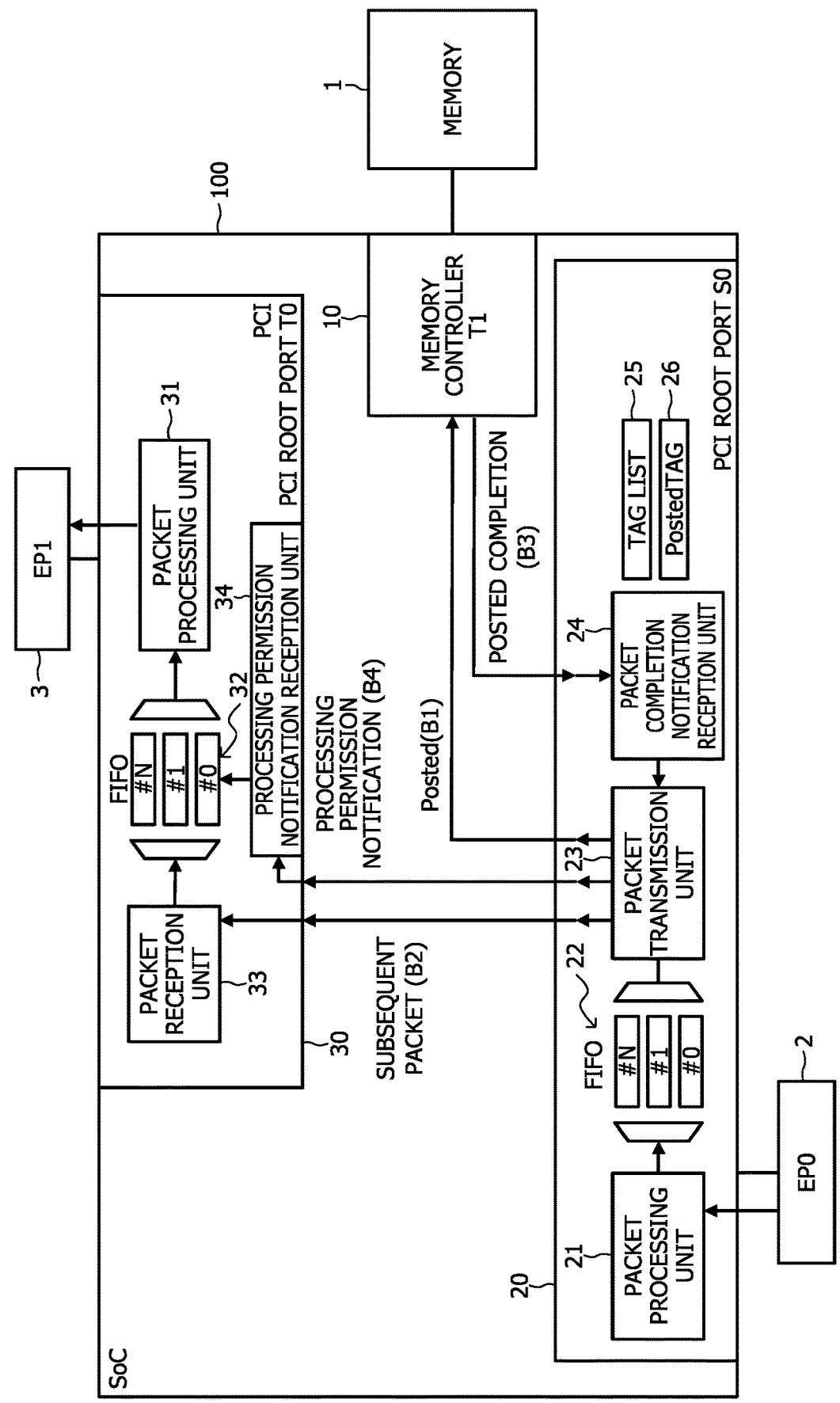
FIG. 2 is a block diagram schematically illustrating a first example of a hardware configuration of a packet control apparatus according to an embodiment.

FIG. 2 is a block diagram schematically illustrating a first example of a hardware configuration of a packet control apparatus 100 according to the embodiment.

Referring to FIG. 2, a PCI root port 20 (PCI root port S0), a PCI root port 30 (PCI root port T0), and a memory controller 10 (memory controller T1) exist. S0 and T0 are respectively disposed at two physically separate positions in the packet control apparatus (SoC) 100.

PCI end point devices EP2 (EP0) and EP3 (EP1) are coupled to the respective root ports, and a memory 1 serving as the host memory is coupled to the memory controller 10.

According to the embodiment illustrated in FIG. 2, description will be given with an example in which the sequence control point in a transmission unit that receives PCI packets and transmits the PCI packets to respective destinations in the SoC 100 is the root port (S0), the transmission target of the preceding posted packet is a memory controller T1, and a transmission target of the subsequent packet is the root port (T0), and configurations and operations of S0 and T0 will be mainly described.

S0 receives PCI packets transmitted from the end point EP0 of a coupling target of the PCI bus of S0 at a packet processing unit 21 and sets the received packets in a FIFO 22.

At the same time, a packet transmission unit 23 of S0 sequentially extracts the packets from the FIFO 22 and transmits the extracted packets to the respective destinations. In the transmission, in order to identify the packets, a TAG list 25 is referred to so as to assign TAG numbers.

Here, it is assumed that the first packet registered in entry #0 of the FIFO 22 is a posted packet and destined for the memory controller T1. Since there is no posted packet previously transmitted, S0, at the packet transmission unit 23, immediately transmits packet #0 to the memory controller 10 (see reference sign B1).

At the same time, the TAG number assigned to packet #0 is registered in a posted TAG 26.

All the packets of entry #1 and subsequent entries of the FIFO 22 are packets destined for T0, and for convenience of description, it is assumed that all the packets are the non-posted packets or the completion packets.

In a case where the technique according to the present embodiment is not used, since packet #0 is posted, the subsequent packet may not be overtaken this packet. Thus, the subsequent packet may not be transmitted until a completion notification of #0 is returned. Accordingly, when the number of entries of the FIFO 22 is small, the FIFO 22 is filled, and there is no choice but to temporarily interrupt reception from the PCI bus. Consequently, the performance is not necessarily obtained.

However, according to the present embodiment, the subsequent packets from packet #1 are transmitted to T0 without waiting for the completion notification of #0 (see reference sign B2). However, at the time of transmission, the TAG number held in the posted TAG 26 is set to a preceding TAG number of preceding TAG information of the packet (for example, processing wait information), the preceding TAG information is validated, and the transmission is performed.

The preceding TAG information given to a packet is information on a preceding packet that the packet is to wait. When T0 receives a packet for which the preceding TAG is valid, T0 does not immediately process the packet and waits until the processing permission notification arrives.

When transmitting packets #1 and the subsequent packets, S0 records the preceding TAG information and the destinations in the entries of their own TAGs in the TAG list 25.

When a response of packet #0 (for example, the posted completion notification) is returned from the T1 (see reference sign B3), the packet transmission unit 23 of S0 receives the completion information of the TAG from a packet completion notification reception unit 24 of S0. S0 determines the completion of the preceding TAG of each entry of the TAG list 25 at the packet transmission unit 23 and performs the processing permission notification for a processing permission notification reception unit 34 of T0 (see reference sign B4). The processing permission notification notifies the registered destination of the preceding TAG number.

When the above-described determination is made for a plurality of entries at the same time, it is sufficient that only one notification be transmitted to a single destination instead of transmitting the same processing permission notifications to the same destination.

T0 that has received the processing permission notification at a packet reception unit 33 compares the processing permission notification with the preceding TAG information of the entry of a FIFO 32 in T0 and, when determined as the processing permission target, invalidates the preceding TAG information of the entry of the FIFO 32 to allow a packet processing unit 31 of T0 to proceed with the processing.

When there are any entries which the preceding TAG information is invalid, the packet processing unit 31 of T0 performs sequential processing (transmits the packet to the PCI bus).

For example, a transmission source device adds the processing wait information indicating whether to permit immediate processing to the packet to be transmitted to a transmission target device. In a case where the processing wait information is added to the packet, the transmission target device processes the packet after waiting for and receiving the processing permission notification from the transmission source device.

The packet to which the processing wait information is added is a peer-to-peer packet and may be transmitted from a first PCI root port as the transmission source device to a second PCI root port as the transmission target device. The processing permission notification may be transmitted from the transmission source device to the transmission target device after processing, performed by the memory controller, of the preceding packet which has been received in advance by the transmission source device and which is destined for the host memory.

In this way, since the packets do not stay in the FIFO of S0, packet reception from the PCI bus is not desired to be stopped, and degradation in performance may be suppressed.

Figure 3:
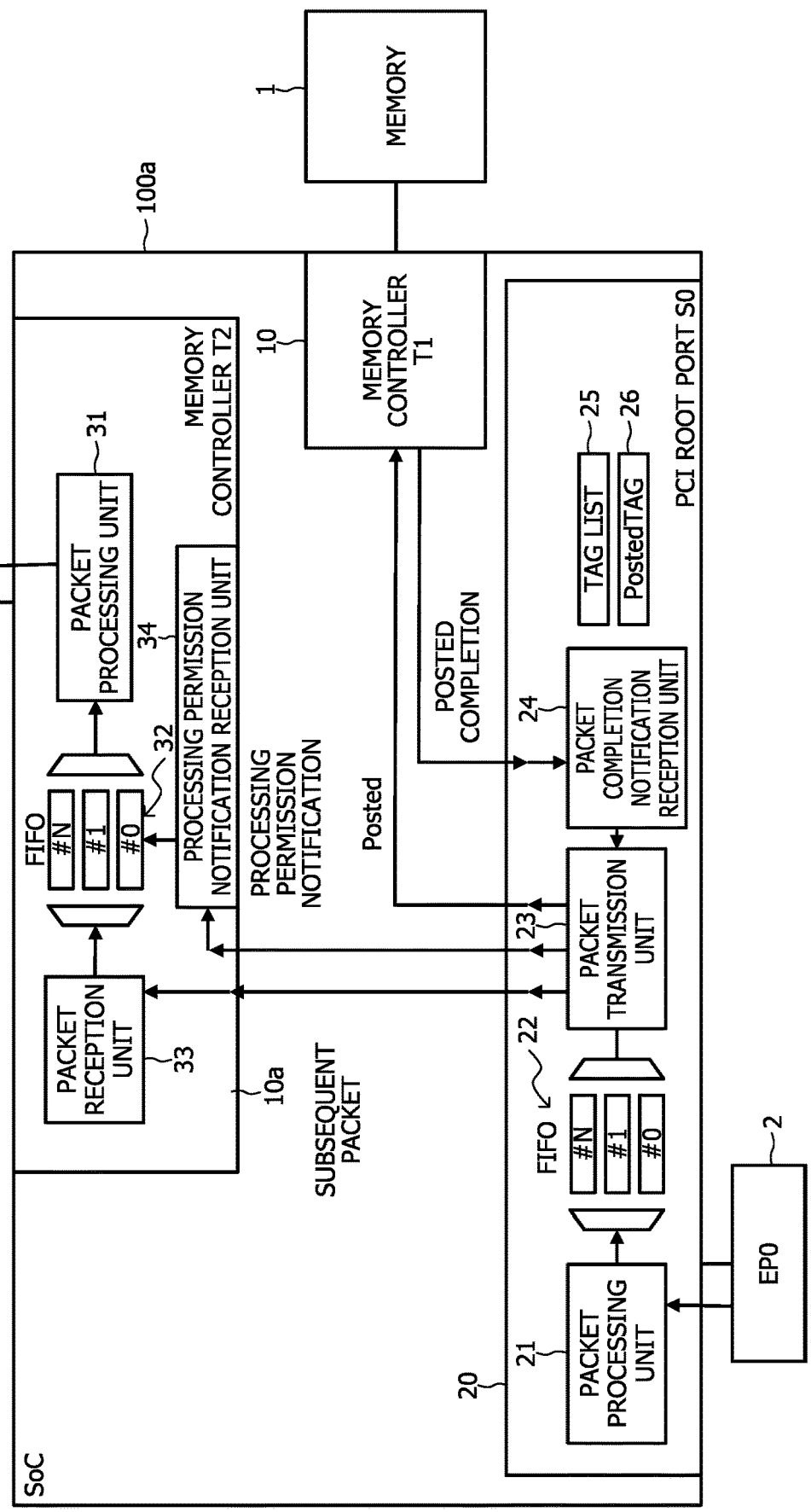
FIG. 3 is a block diagram schematically illustrating a second example of a hardware configuration of a packet control apparatus according to the embodiment.

FIG. 3 is a block diagram schematically illustrating a second example of a hardware configuration of a packet control apparatus 100a according to the embodiment.

Referring to FIG. 3, the PCI root port 20 (PCI root port S0), a memory controller 10a (memory controller T2), and the memory controller 10 (memory controller T1) exist. S0 and T2 are respectively disposed at two physically separate positions in the packet control apparatus (SoC) 100a.

The PCI end point device EP2 (EP0) is coupled to the root port, and the memories 1 and is which are host memories are respectively coupled to the memory controllers 10 and 10a.

Although the mechanism for separating the processing permission notification and the packet body between S0 and T0 has been described in the embodiment illustrated in FIG. 2, a similar mechanism may be disposed between S0 and T1.

As illustrated in FIG. 3, the present embodiment may also be applied to a case where the preceding posted packet is destined for the memory controller T1 and the subsequent packet is destined for the memory controller T2.

In this case, although the subsequent packet is transmitted to T2 without waiting for the completion of the preceding posted packet, T2 puts the processing on hold until the processing permission notification arrives and actually accesses the memory when T2 receives the processing permission notification.

Also in a case where the preceding posted packet is destined for an other root port and the subsequent packet is destined for yet an other root port, the present disclosure may be similarly applied by disposing the circuit described above. When control according to the gist of the present embodiment is performed for an other destination that has not been described so far, the effects of the present embodiment may be obtained by using a similar mechanism.

Depending on an internal configuration, this mechanism may be selectively disposed only at a part formed with a specific destination in consideration of an implementing difficulty level, resources needed to implement the logic, or a use case. The technique of related art of writing to a cache instead of the host memory or the technique of related art of improving the maximum throughput performance on the internal bus side so as to be higher than that on the PCI bus side may be used together with the technique according to the present disclosure.

According to the embodiment illustrated in FIG. 2, control is performed as follows: the TAG number of the preceding posted packets with the completion of which is to be waited is used as the number notified by the processing permission notification, thereby to determine the processing permission. However, at the time of transmission of the packet body to T0, only whether there is the preceding posted packets may be transmitted to the destination, and the processing permission notification may be notified by the TAG number of the packet itself that is desired to be permitted to be processed and has already been transmitted to T0.

However, in this case, when a plurality of packets transmitted to T0 are simultaneously permitted, permission notifications are desired for all the packets. Thus, there is a disadvantage in that internal bus occupancy with the permission notifications increases. In this case, for example, T0 may determine the processing as follows: the TAG numbers to be transmitted are assigned in ascending order with respect to the transmission order at all times; the processing permission notification is transmitted only once only with the last TAG number; and T0 may process those with TAG numbers before the notified TAG number.

For example, the packet to which the processing wait information is added is a packet destine for the host memory and may be transmitted from the first PCI root port as the transmission source device to the memory controller as the transmission target device. The processing permission notification may be transmitted from the transmission source device to the transmission target device after processing, performed by the other memory controller, of the preceding packet which has been received in advance by the transmission source device and which is destined for an other host memory.

The memory 1 and the memory controller 10 in which the preceding packet is processed illustrated in FIG. 3 may be the PCI root port and EP. For example, the processing permission notification may be transmitted from the transmission source device to the transmission target device after processing, performed by an other PCI root port, of the preceding packet which has been received in advance by the transmission source device and which is destined for the other PCI root port.

A cache of the main memory, a home agent that manages the cache of the main memory, and the like may exist in the SoCs 100 and 100a, and a peripheral configuration, an operation, and the like may be freely selected.

Figure 4:
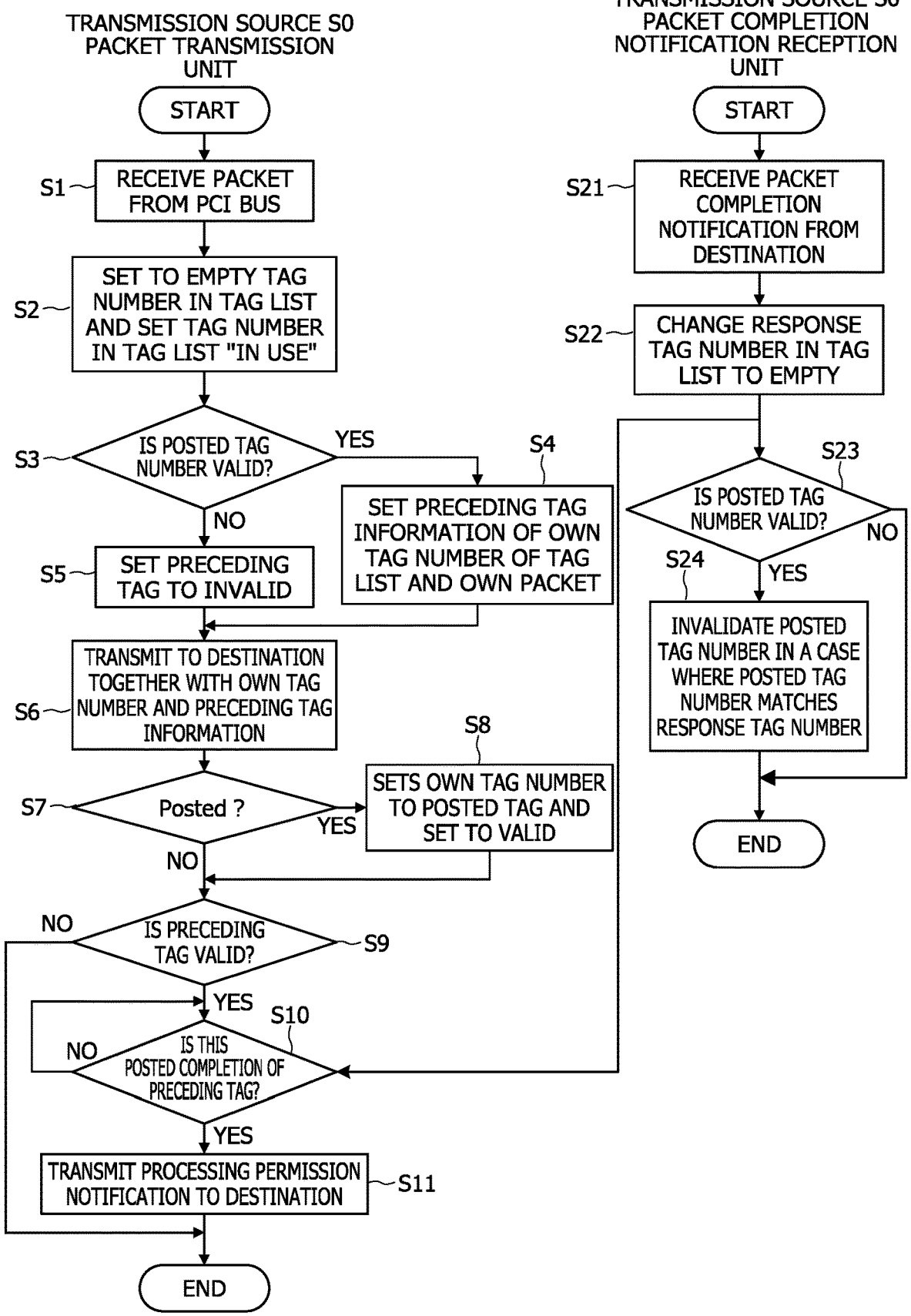
FIG. 4 is a flowchart explaining a packet transmission process and a packet completion notification reception process in a transmission source device as the embodiment.

A packet transmission process and a packet completion notification reception process in the transmission source device as the embodiment will be described with reference to a flowchart (operations S1 to S11 and S21 to S24) illustrated in FIG. 4.

The packet transmission unit 23 of the PCI root port 20 (PCI root port S0) receives a packet from the PCI bus (operation S1).

The packet transmission unit 23 sets the packet to an empty TAG number in the TAG list 25 and sets the TAG number in the TAG list 25 to "in use" (operation S2).

The packet transmission unit 23 determines whether the posted TAG number is valid (operation S3).

In a case where the posted TAG number is valid (see a YES route in operation S3), the packet transmission unit 23 sets the preceding TAG information of an own TAG number of the TAG list 25 and an own packet (operation S4). The process proceeds to operation S6.

In contrast, in a case where the posted TAG number is not valid (see a NO route in operation S3), the packet transmission unit 23 sets the preceding TAG to invalid (operation S5).

The packet transmission unit 23 transmits to the destination T0 together with the own TAG number and the preceding TAG information (operation S6).

The packet transmission unit 23 determines whether the packet is posted packet (operation S7).

In a case where the packet is the posted packet (see a YES route in operation S7), the packet transmission unit 23 sets the own TAG number to the posted TAG and sets to valid (operation S8). The process proceeds to operation S9.

In contrast, in a case where the packet is not posted packet (see a NO route in operation S7), the packet transmission unit 23 determines whether the preceding TAG is valid (operation S9).

In a case where the preceding TAG is not valid (see a NO route in operation S9), the packet transmission process ends.

In contrast, in a case where the preceding TAG is valid (see a YES route in operation S9), the packet transmission unit 23 determines whether the notification of the completion of the posted packet of the preceding TAG is received from the packet completion notification reception unit 24 (operation S10).

In a case where the notification of the completion of the posted packet of the preceding TAG is not received from the packet completion notification reception unit 24 (see a NO route of operation S10), the processing of operation S10 is repeatedly performed.

In contrast, in a case where the notification of the completion of the posted packet of the preceding TAG is received from the packet completion notification reception unit 24 (see a YES route in operation S10), the packet transmission unit 23 transmits the processing permission notification to the destination (operation S11). The packet transmission process ends.

The packet completion notification reception unit 24 of the PCI root port 20 (PCI root port S0) receives the packet completion notification from the destination (operation S21).

The packet completion notification reception unit 24 changes a response TAG number in the TAG list 25 to empty (operation S22).

The packet completion notification reception unit 24 notifies the packet transmission unit 23 of the posted completion of the preceding TAG for the operation S10. In addition, the packet completion notification reception unit 24 determines whether the posted TAG is valid (operation S23).

In a case where the posted TAG is not valid (see a NO route in operation S23), the packet completion notification reception process ends.

In contrast, in a case where the posted TAG number is valid (see a YES route in operation S23), the packet completion notification reception unit 24 invalidates the posted TAG when the posted TAG number matches the response TAG number (operation S24). The packet completion notification reception process ends.

Figure 5:
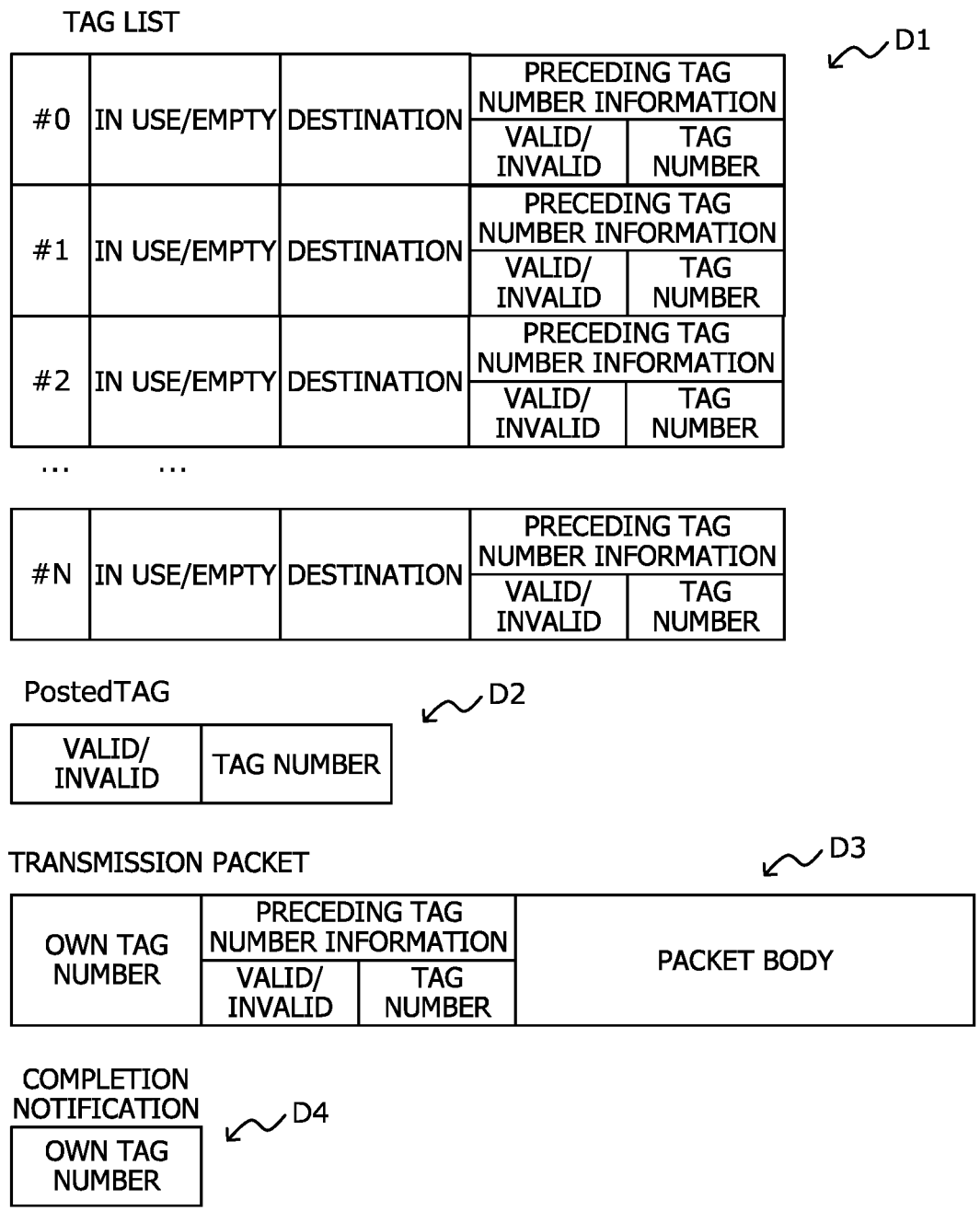
FIG. 5 is a table illustrating a TAG number list, a posted TAG, a transmission packet, and a completion notification according to the embodiment.

FIG. 5 is a table illustrating the TAG number list, the posted TAG, the transmission packet, and the completion notification according to the embodiment.

In the TAG list 25 denoted by reference sign D1, the distinction between in use/empty, destination, and the preceding TAG number information are associated with each other for each of the TAG numbers #0 to #N. The preceding TAG number information includes the distinction between valid/invalid of the preceding TAG and the TAG number.

The posted TAG 26 denoted by reference sign D2 includes the distinction between valid/invalid and the TAG number.

The transmission packet denoted by reference sign D3 includes the own TAG number, the preceding TAG number information, and the packet body. The preceding TAG number information includes the distinction between valid/invalid of the preceding TAG and the TAG number.

The completion notification denoted by reference sign D4 includes the own TAG number.

Figure 6:
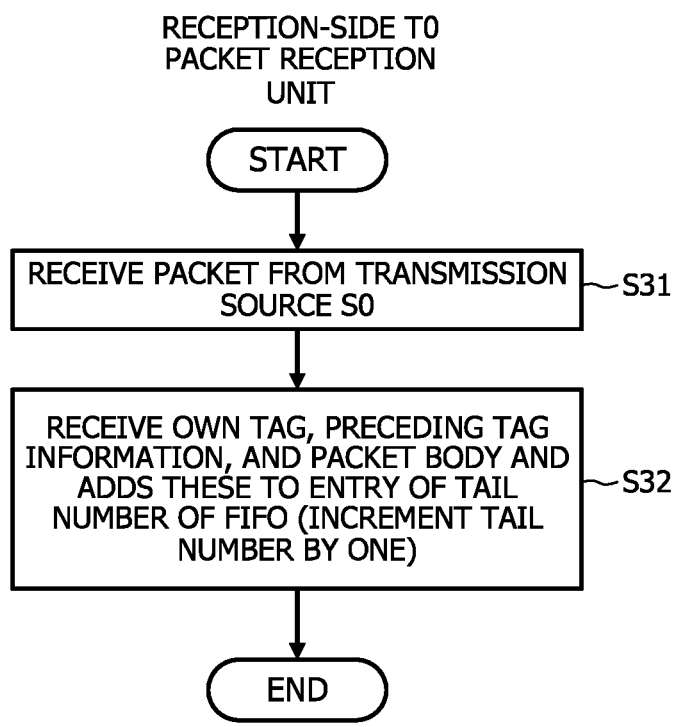
FIG. 6 is a flowchart explaining a packet reception process in a reception-side device as the embodiment.

Next, a packet reception process in a reception-side device as the embodiment will be described with reference to a flowchart (operations S31 and S32) illustrated in FIG. 6.

The packet reception unit 33 of the PCI root port 30 (PCI root port T0) receives the packet from the PCI root port 20 (PCI root port S0) which is the transmission source (operation S31).

The packet reception unit 33 receives the own TAG, the preceding TAG number information, and the packet body and adds the own TAG, the preceding TAG number information, and the packet body to the entry of a FIFO 32 tail number (the tail number is incremented by one) (operation S32). The packet reception process ends.

Figure 7:
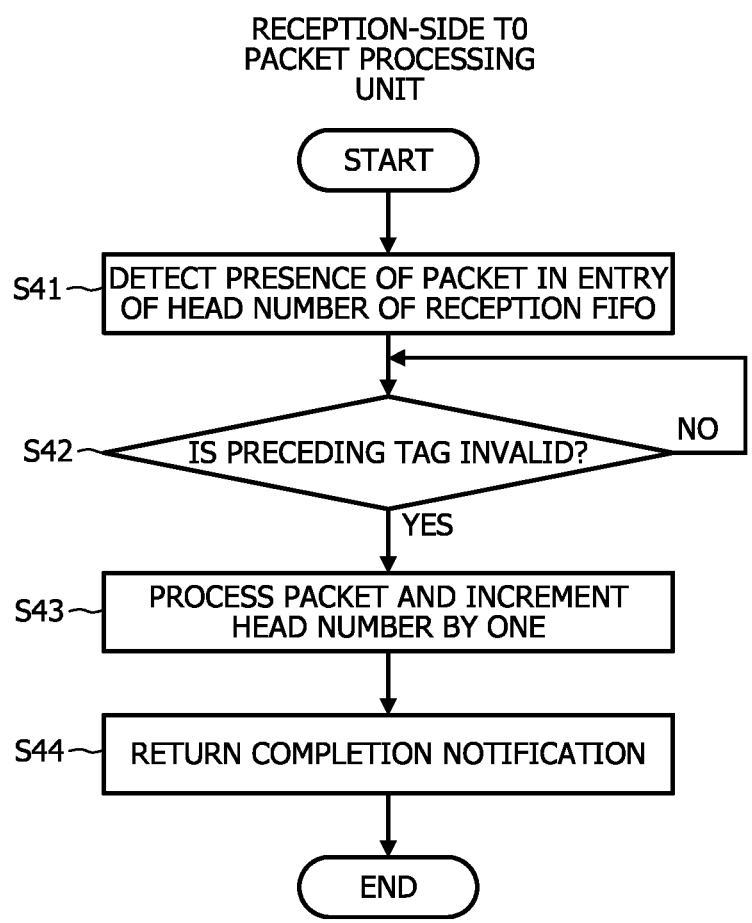
FIG. 7 is a flowchart explaining a packet process in the reception-side device as the embodiment.

Next, a packet process in the reception-side device as the embodiment will be described with reference to a flowchart (operations S41 to S44) illustrated in FIG. 7.

The packet processing unit 31 of the PCI root port 30 (PCI root port T0) detects the presence of the packet in the entry of the head number of the FIFO 32 on the reception side (operation S41).

The packet processing unit 31 determines whether the preceding TAG is invalid (operation S42).

In a case where the preceding tag is not invalid (see a NO route of operation S42), the processing of operation S42 is repeatedly performed.

In contrast, in a case where the preceding tag is invalid (see a YES route in operation S42), the packet processing unit 31 processes the packet and increments the head number by one (operation S43).

The packet processing unit 31 returns the completion notification to the PCI root port 20 (PCI root port S0) which is the transmission source (operation S44). The packet process ends.

Figure 8:
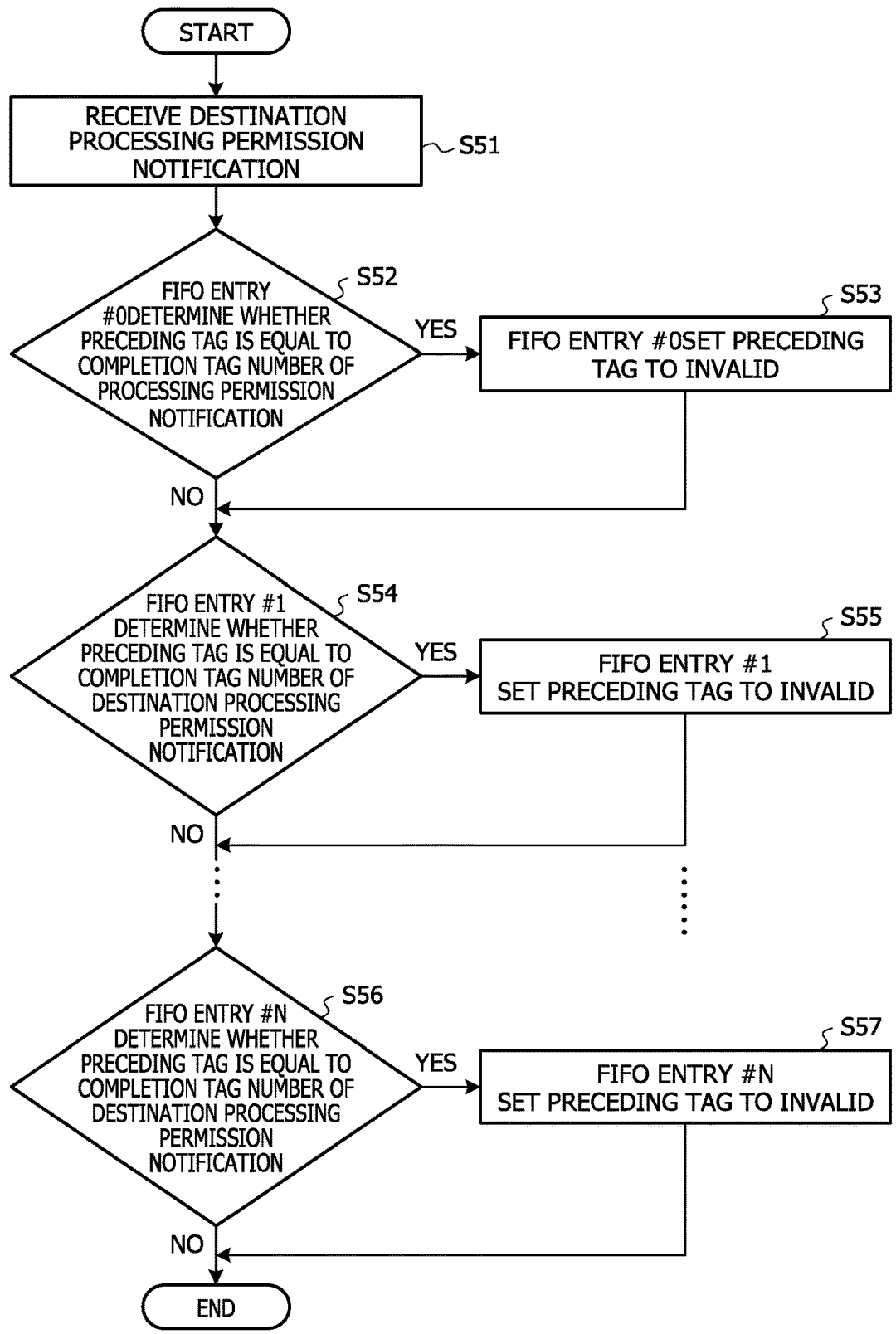
FIG. 8 is a flowchart explaining a processing permission notification reception process in the reception-side device as the embodiment.

Next, a processing permission notification reception process in the reception-side device as the embodiment will be described with reference to a flowchart (operations S51 to S57) illustrated in FIG. 8.

The processing permission notification reception unit 34 of the PCI root port 30 (PCI root port T0) receives the processing permission notification in the destination of the packet (operation S51).

The processing permission notification reception unit 34 determines whether the preceding TAG is equal to the completion TAG number of the processing permission notification in entry #0 of the FIFO 32 (operation S52).

In a case where the preceding TAG is equal to the completion TAG number of the processing permission notification (see a YES route of operation S52), the processing permission notification reception unit 34 sets the preceding TAG to invalid in entry #0 of the FIFO 32 (operation S53). The process proceeds to operation S54.

In contrast, in a case where the preceding TAG is not equal to the completion TAG number of the processing permission notification (see a NO route in operation S52), the processing permission notification reception unit 34 determines whether the preceding TAG is equal to the completion TAG number of the processing permission notification in entry #1 of FIFO 32 (operation S54).

In a case where the preceding TAG is equal to the completion TAG number of the processing permission notification (see a YES route of operation S54), the processing permission notification reception unit 34 sets the preceding TAG to invalid in entry #1 of the FIFO 32 (operation S55). The process proceeds to the processing of entry #2 of the FIFO 32.

In contrast, in a case where the preceding TAG is not equal to the completion TAG number of the processing permission notification (see a NO route of operation S54), the process proceeds to the processing of entry #2 of the FIFO 32.

Upon completion of the processing of entry #N−1 of the FIFO 32, the processing permission notification reception unit 34 determines whether the preceding TAG is equal to the completion TAG number of the processing permission notification in entry #N of the FIFO 32 (operation S56).

In a case where the preceding TAG is equal to the completion TAG number of the processing permission notification (see a YES route of operation S56), the processing permission notification reception unit 34 sets the preceding TAG to invalid in entry #N of the FIFO 32 (operation S57). The processing permission notification reception process ends.

In contrast, in a case where the preceding TAG is not equal to the completion TAG number of the processing permission notification (see a NO route of operation S56), the processing permission notification reception process ends.

Figure 9:
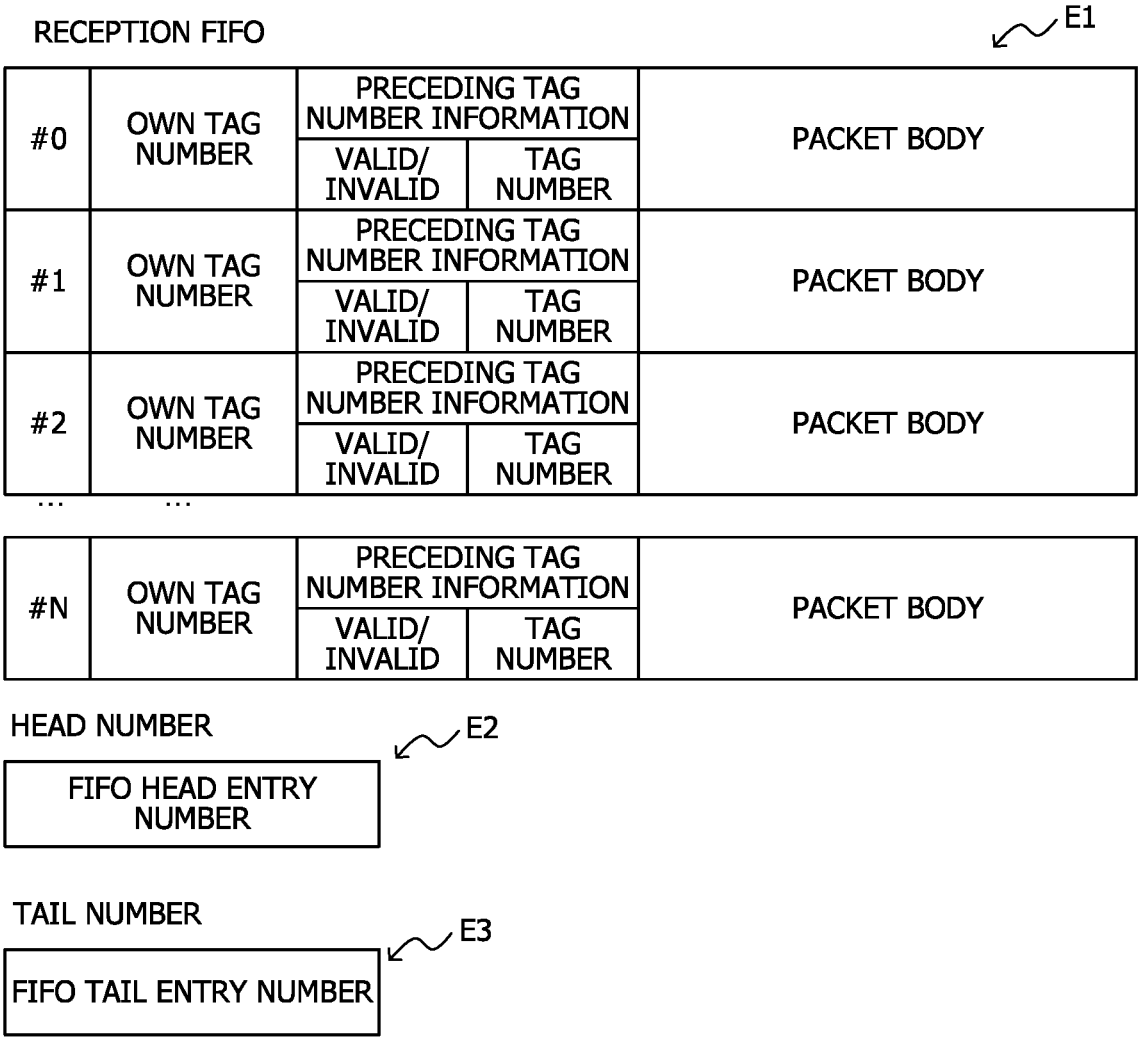
FIG. 9 is a table illustrating a reception first-in, first-out (FIFO), a head number, and a tail number according to the embodiment.

FIG. 9 is a table illustrating a reception FIFO, a head number, and a tail number according to the embodiment.

In a reception FIFO denoted by reference sign E1, the own TAG number, the preceding TAG number information, and the packet body are associated with each other for each of entries #0 to #N. The preceding TAG number information includes the distinction between valid/invalid of the preceding TAG and the TAG number.

The head number denoted by reference sign E2 includes a FIFO head entry number.

The tail number denoted by reference sign E3 includes a FIFO tail entry number.

[C] Effects

Figure 10:
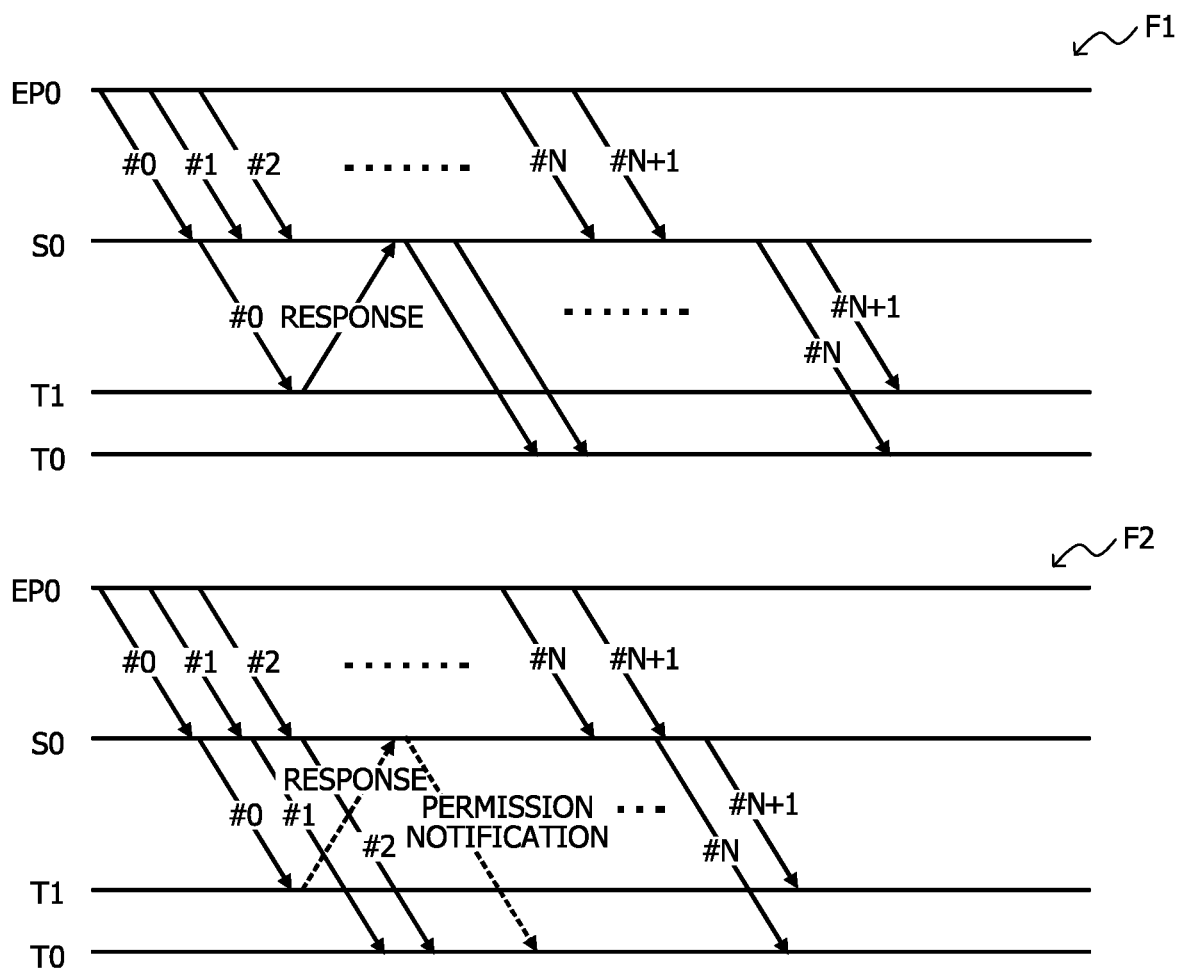
FIG. 10 is a time chart explaining use efficiency of an internal bus according to the related example and the embodiment.

FIG. 10 is a time chart explaining the use efficiency of the internal bus according to a related example and the embodiment.

In order to clearly describe the effects of the embodiment, it is assumed that packet arrives at the maximum throughput from the PCI bus side and may be transmitted to the internal bus at the same maximum throughput.

In a case where such a packet pattern is assumed, at reference sign F1 denoting the related example, S0 that has received packet #0 immediately transmits the packet to the internal bus toward T1. Although packets #1 and the subsequent packets are continuously received, packets #1 and the subsequent packets may not be transmitted until packet #0 is completed. Thus, the internal bus is in an unused state. Only after the completion of packet #0 has been recognized, packets #1 and the subsequent packets may be transmitted to the internal bus, and the use of the internal bus is restarted.

When there is such an unignorable non-use period, in a case of continuous reception from the PCI bus at the maximum throughput at all times, the throughput is not necessarily maintained on the internal bus side. Thus, it is desired to temporarily stop the packet reception from the PCI bus.

In contrast, at reference sign F2 denoting the present embodiment, packet #1 and subsequent packets may be transmitted immediately after packet #0 has been transmitted to the internal bus. Thus, there is no period during which the internal bus is not used. Accordingly, the throughput of the PCI bus may be maintained.

According to the present embodiment, the packet of the processing permission notification is desired to be additionally transmitted. Thus, although it is slight, the internal bus is occupied. However, the influence of it is very small. The packet for which, for example, the throughput is desired is a packet with data and, compared to the packet with data, the packet of the processing permission notification is a very small packet. Thus, the influence due to the occupancy of the internal bus is almost negligible. Also from the viewpoint of the use efficiency of the internal bus, it is understood that the present embodiment produces an effect of suppressing degradation in throughput performance.

With the packet control apparatus 100 and a method of controlling a packet according to the above-described embodiment, for example, the following operation effects may be obtained.

The transmission source device adds the processing wait information indicating whether to permit immediate processing to the packet to be transmitted to the transmission target device. In the case where the processing wait information is added to the packet, the transmission target device processes the packet after waiting for and receiving the processing permission notification from the transmission source device.

Thus, both the inter-packet sequence control and the throughput performance in packet communication may be realized.

The packet to which the processing wait information is added is a peer-to-peer packet and may be transmitted from the first PCI root port as the transmission source device to the second PCI root port as the transmission target device. Thus, both the inter-packet sequence control and the throughput performance may be realized for PCI communication for peer-to-peer packets.

The processing permission notification may be transmitted from the transmission source device to the transmission target device after processing, performed by the memory controller, of the preceding packet which has been received in advance by the transmission source device and which is destined for the host memory. Thus, both the inter-packet sequence control and the throughput performance may be realized for PCI communication for peer-to-peer packets to be processed after the packet destined for the host memory.

The packet to which the processing wait information is added is a packet destine for the host memory and may be transmitted from the first PCI root port as the transmission source device to the memory controller as the transmission target device. Thus, both the inter-packet sequence control and the throughput performance for packet communication destined for the host memory may be realized.

The processing permission notification may be transmitted from the transmission source device to the transmission target device after processing, performed by an other memory controller, of the preceding packet which has been received in advance by the transmission source device and which is destined for an other host memory. Thus, both the inter-packet sequence control and the throughput performance may be realized for the packet which is destined for the host memory to be processed after the packet destined for the other host memory.

The processing permission notification may be transmitted from the transmission source device to the transmission target device after processing, performed by an other PCI root port, of the preceding packet which has been received in advance by the transmission source device and which is destined for the other PCI root port. Thus, both the inter-packet sequence control and the throughput performance may be realized for the packet which is to be processed after the peer-to-peer packet and destined for the host memory.

[D] Others

The disclosed technique is not limited to the above-described embodiment. The disclosed technique may be carried out by variously modifying the technique without departing from the gist of the present embodiment. Each of the configurations and each of the processes of the present embodiment may be employed or omitted as desired or may be combined as appropriate.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A packet control apparatus comprising:
a transmission source device configured to add processing wait information that indicates whether to permit immediate processing to a packet to be transmitted to a destination; and
a transmission target device configured to, when the processing wait information is added to the packet, wait for and receive a separate processing permission notification that indicates a completion of a preceding packet from the transmission source device, and process the packet, the transmission target device being a device of the destination,
wherein the transmission source device and the transmission target device are coupled to each other through a bus.

2. The packet control apparatus according to claim 1,
wherein the packet to which the processing wait information is added is a peer-to-peer packet and transmitted from a first Peripheral Component Interconnect (PCI) root port as the transmission source device to a second PCI root port as the transmission target device.

3. The packet control apparatus according to claim 2,
wherein the separate processing permission notification is transmitted from the transmission source device to the transmission target device after processing of the preceding packet which has transmitted in advance from the transmission source device to a host memory for which the processing is performed by a memory controller.

4. The packet control apparatus according to claim 1,
wherein the packet to which the processing wait information is added is a packet that is destined for a host memory and that is transmitted from a first Peripheral Component Interconnect (PCI) root port as the transmission source device to a memory controller as the transmission target device.

5. The packet control apparatus according to claim 4,
wherein the separate processing permission notification is transmitted from the transmission source device to the transmission target device after processing of the preceding packet which has transmitted in advance from the transmission source device to another host memory for which the processing is performed by another memory controller.

6. The packet control apparatus according to claim 4,
wherein the separate processing permission notification is transmitted from the transmission source device to the transmission target device after processing, of the preceding packet which has transmitted in advance from the transmission source device to a second Peripheral Component Interconnect (PCI) root port for which the processing is performed by the second PCI root port.

7. A packet control method of a packet control apparatus that includes a transmission source device and a transmission target device, the packet control method comprising:
adding processing wait information that indicates whether to permit immediate processing to a packet to be transmitted to the transmission target device, by the transmission source device; and
when the processing wait information is added to the packet, waiting for and receiving a separate processing permission notification that indicates a completion of a preceding packet from the transmission source device, and processing the packet, by the transmission target device;
wherein the transmission source device and the transmission target device are coupled to each other through a bus.

8. The packet control method according to claim 7,
wherein the packet to which the processing wait information is added is a peer-to-peer packet and transmitted from a first Peripheral Component Interconnect (PCI) root port as the transmission source device to a second PCI root port as the transmission target device.

9. The packet control method according to claim 8,
wherein the separate processing permission notification is transmitted from the transmission source device to the transmission target device after processing of the preceding packet which has transmitted in advance from the transmission source device to a host memory for which the processing is performed by a memory controller.

10. The packet control method according to claim 7,
wherein the packet to which the processing wait information is added is a packet that is destined for a host memory and that is transmitted from a first Peripheral Component Interconnect (PCI) root port as the transmission source device to a memory controller as the transmission target device.

11. The packet control method according to claim 10,
wherein the separate processing permission notification is transmitted from the transmission source device to the transmission target device after processing of the preceding packet which has transmitted in advance from the transmission source device to another host memory for which the processing is performed by another memory controller.

12. The packet control method according to claim 10,
wherein the separate processing permission notification is transmitted from the transmission source device to the transmission target device after processing, of the preceding packet which has transmitted in advance from the transmission source device to a second Peripheral Component Interconnect (PCI) root port for which the processing is performed by the second PCI root port.

* * * * *